United States Patent [19]

Dieckmann

[11] Patent Number: 4,722,080
[45] Date of Patent: Jan. 26, 1987

[54] TRANSDUCER ARM ASSEMBLY FOR DISK PLAY-BACK MACHINES

[76] Inventor: Ralf E. Dieckmann, 1C Spruce La., Danbury, N.H. 03230

[21] Appl. No.: 679,124

[22] Filed: Dec. 6, 1984

[51] Int. Cl.$^4$ .............................................. G11B 21/16
[52] U.S. Cl. .................................... 369/254; 369/250; 369/251
[58] Field of Search ............... 369/250, 251, 252, 254, 369/253

[56] References Cited

U.S. PATENT DOCUMENTS

| | | | |
|---|---|---|---|
| 2,006,605 | 7/1935 | Putnoky | 369/250 |
| 2,966,360 | 12/1960 | Herve | 369/250 |
| 3,059,934 | 10/1962 | Urmeny | 369/250 |
| 3,476,394 | 11/1969 | Birch | 369/250 |
| 4,316,280 | 2/1982 | Kanchev | 369/250 |

FOREIGN PATENT DOCUMENTS 1358981  7/1974  United Kingdom ................ 369/250

Primary Examiner—Steven L. Stephan

[57] ABSTRACT

A tangential transducer arm assembly for disk play-back machines, whose pivot for movement in the plane which is parallel to the surface of a disk, is disposed upon a carriage for linear movement upon a track in a plane which exists perpendicular to said disk and which intersects the rotational axis of said disk.

One of two embodiments utilizes the frictional drag between said disk and a stylus to pull said carriage along said track, while a mass suspended in a liquid checks that movement to hold said carriage in the correct position for transducer arm tangency.

The other embodiment utilizes a stepping motor to drive said carriage along said track. Said stepping motor derives its drive signal from the misalignment of a magnet and a differential Hall effect sensor. Said magnet is part of said transducer arm and said differential Hall effect sensor is fixed to a true tangency indicating reference base, whose pivot is the same as said pivot and whose rotation is determined by a cam surface.

A lift motor, having an eccentric pulley fixed to a central magnet disk with an up and a down position, governs the start/stop of said stepping motor via said magnet disk and a stationary Hall effect switch.

15 Claims, 13 Drawing Figures

TRANSDUCER ARM ASSEMBLY FOR DISK PLAY-BACK MACHINES

BACKGROUND OF THE INVENTION

This invention relates to disk play-back machines and more particularly to improvements in tangentially tracking transducer arm assemblies therefor, whose vertical and horizontal pivots are mounted on a carriage for movement along a track and in a plane parallel to the surface of the record disk to be reproduced.

All transducer arm assemblies of the aforementioned type commonly slide along a track whose length is at least as great as the distance, measured along the radius, between the largest modulated groove radius of a long playing record disk and the smallest modulated groove radius of said disk. The largest modulated groove radius and the smallest modulated groove radius of a standard long playing record disk is 5.720" and 2.362" respectively, which results in a track length of 3.358". These tracks are actually longer though, since the tranducer arm support carriage must be allowed to slide into a rest position. Because of these facts, transducer arm assemblies of the aforementioned type are quite long and usually require one entire side of a turntable base for mounting space. At least one after market transducer arm assembly of the aforementioned type overhangs the side walls of some turntables when it has been mounted properly, precluding closure of the dust cover. In addition to these disadvantages, the sliding carriages introduce mechanical noise which is picked up by the transducer in contact with the record disk for subsequent amplification along with the usable signal from the record disk. Additional disadvantages are introduced by the use of geared down D.C. motors to drive the carriages. These motors must constantly rotate, thus introducing additional mechanical and electrical noise into the play-back system.

Transducer arm assemblies of the aforementioned type, which do not use servo systems, and whose transducer arms are rigidly connected to their carriage, rely on ultra low friction track assemblies but suffer from the problem, that the transducer arm stylus, as it is in contact with the groove in the surface of a record disk "sees" the entire mass of the transducer arm in the horizontal plane.

BRIEF SUMMARY OF THE INVENTION

It is therefore the general object of my present invention to provide a transducer arm assembly of the tangential type which will overcome the above, as well as other disadvantages of prior art tangentially tracking transducer arm assemblies.

It is the principal object of my present invention to provide a track, whose length is at least 53.6% shorter when compared with the tracks of prior art tangentially tracking transducer arm assemblies.

It is also an object of my present invention to provide a transducer arm support carriage which produces at least 53.6% less mechanical noise when compared with the noise produced by the carriages of prior art tangentially tracking transducer arm assemblies.

It is another object of my present invention to provide a transducer arm assembly whose track and carriage unit does not occupy more volume and does not require more mounting surface area than is required by any standard pivoting transducer arm with a fixed lateral pivot.

It is a further object of my present invention to provide a tangentially tracking transducer arm assembly which does not require an external servo system to drive its carriage but which is powered solely by forces inherent in the rotating record disk and wherein the transducer stylus only "sees" the effective mass of the transducer arm, especially in the lateral plane.

It is yet another object of my present inventioin to provide a tangentially tracking transducer arm assembly of my short track type, whose tangency controlling mechanism is located totally external to the periphery of the record disk.

These and other objects, advantages and unique features of my present invention will be more readily apparent from an understanding of the following detailed description of presently preferred embodiments of my invention when considered in conjunction with the accompanying drawings in which:

DETAILED DESCRIPTION

Figure 1:
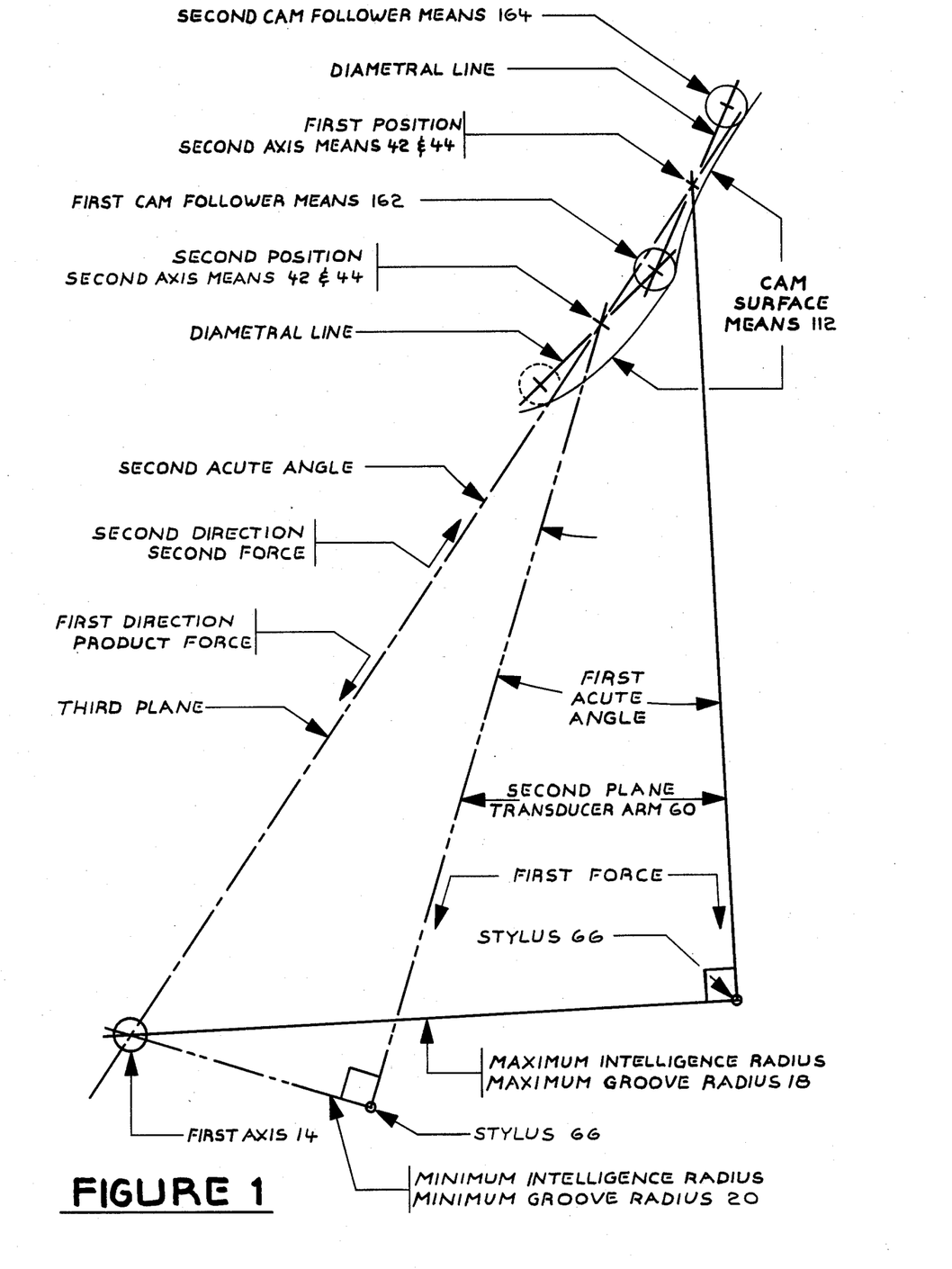
FIG. 1 is a master diagram as viewed perpendicular to a record disk, which explains the terminology applied to the various geometric components of the present invention.
Figure 2:
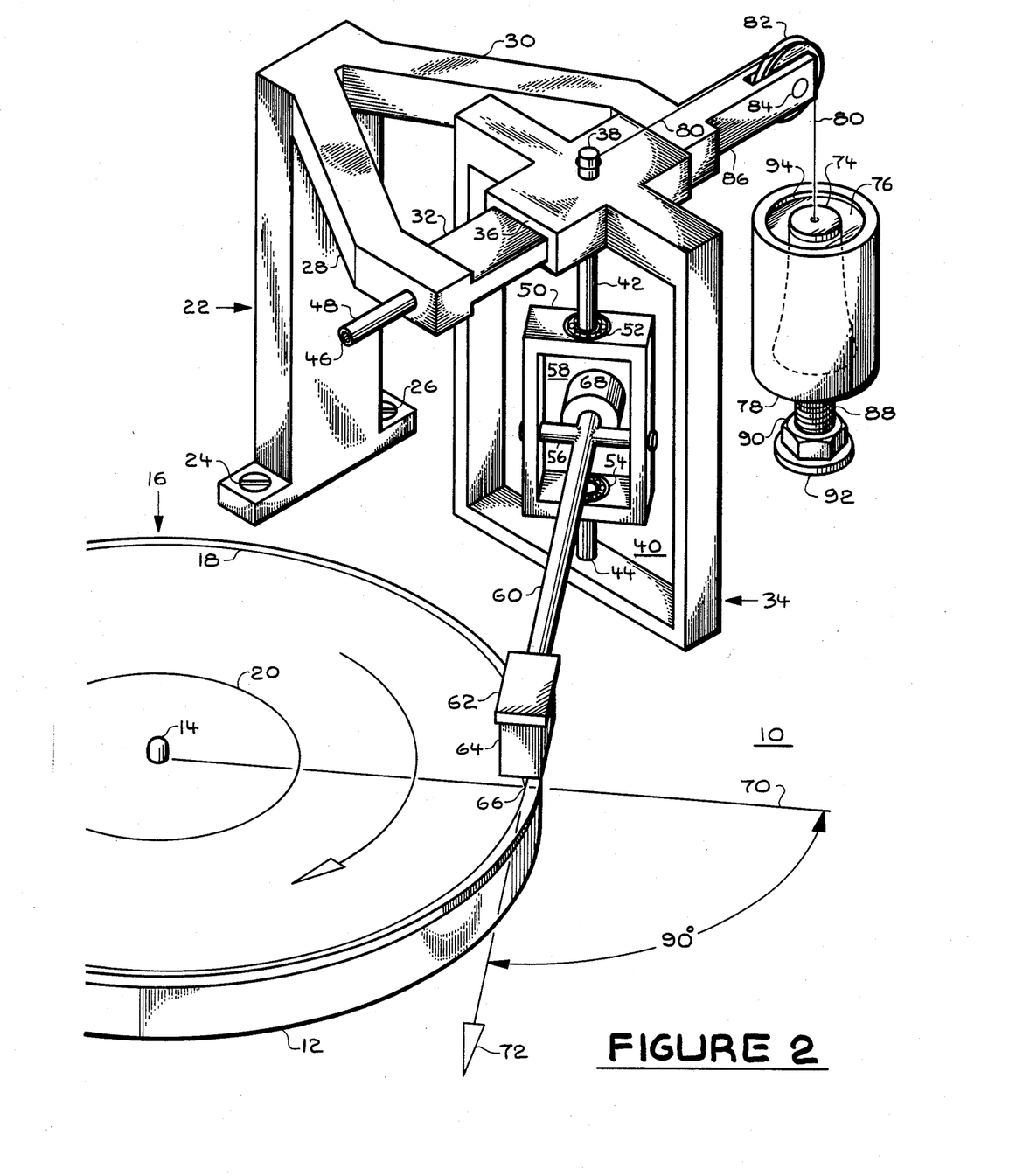
FIG. 2 is an isometric projection of one embodiment of the present invention, showing the transducer arm assembly at the "beginning of play" position.
Figure 3:
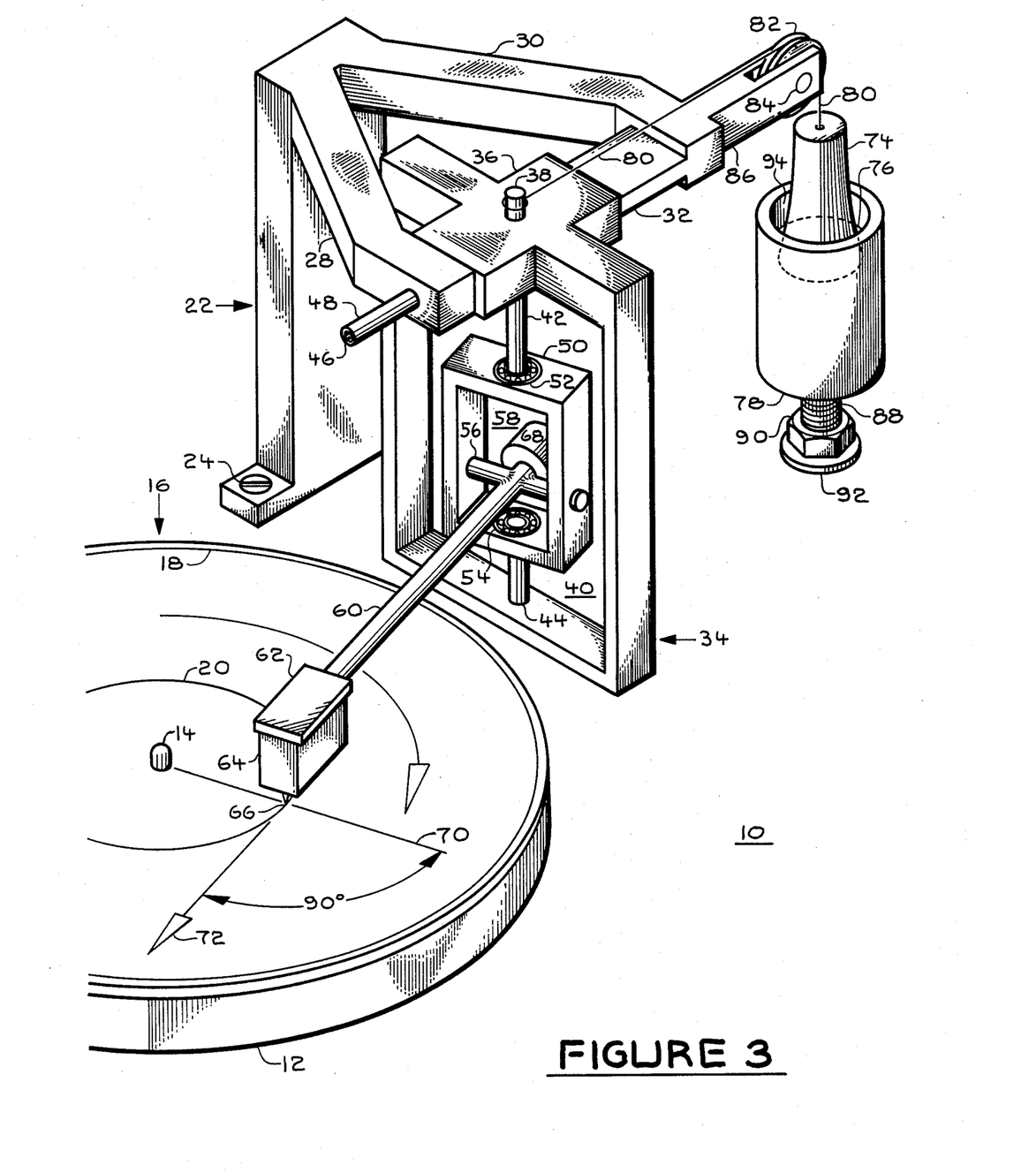
FIG. 3 is identical to FIG. 2, except that the transducer arm assembly is shown at the "end of play" position.

Referring now to the drawings and particularly to FIGS. 1, 2 and 3, it will be understood, except where noted otherwise, that all linear, angular and rotational movements in reference to FIGS. 1, 2 and 3, will take place parallel to the first plane, which is parallel to record disk 16.

Shown is a disk play-back machine, comprising, a base plate 10 which supports a platform 12 for rotation about a first axis 14. A record disk 16 is supported upon platform 12 for synhronous rotation therewith about first axis 14. Guide means support 22 is fastened to base plate 10 by screws 24 and 26. There are two arms 28 and 30 extending from and unitary with guide means support 22. The former support guide means 32 parallel to said first plane and in general alignment with first axis 14. A transducer arm support carriage 34 is supported for linear movement upon guide means 32, the latter being the stationary part of a two-part air bearing, receiving compressed air through orifice 46 of nozzle 48. The linearly moving part of said air bearing is rectangular cylinder 36 which is a unitary part of transducer arm support carriage 34. Second axis means 42 and 44 are disposed within rectangular opening 40 of transducer arm support carriage 34 and perpendicular to said first plane. A transducer arm gimbal 50 is adapted for rotational movement about second axis means 42 and 44. Low friction pivot media 52 and 54 are disposed between transducer arm gimbal 50 and second axis means 42 and 44. A transducer arm tracking force pivot 56 is disposed within rectangular opening 58 of transducer arm gimbal 50 and parallel to said first plane. Transducer arm 60 is fastened to transducer arm tracking force pivot 56 for arcuate movement in a second plane, perpendicular to said first plane. A transducer mounting base 62 is unitary with the end of transducer arm 60 which is adjacent to record disk 16. Transducer 64 is mounted to transducer mounting base 62 in such a way, that stylus 66 of transducer 64 is placed into contact with maximum groove radius 18 of record disk 16. A counterweight 68 is fastened to the end of transducer arm 60 which is opposite transducer 64. Counterweight 68 is adjusted to cause the transducer end of transducer arm 60 to be heavier, relative to transducer arm tracking force pivot 56, thus forcing stylus 66 into frictional contact with maximum groove radius 18 of record disk 16. As previously mentioned, guide means 32 is generally aligned with first axis means 14. The alignment is such, that, if rectangular cylinder 36 of transducer arm support carriage 34 moves along guide means 32, the center line of second axis means 42 and 44 will describe a third plane, perpendicular to said first plane and substantially exactly intersecting first axis 14. When transducer arm support carriage 34 is in its first position as shown in FIG. 2 and when stylus 66 rests in maximum groove radius 18 at the "begining of play", a right angle triangle exists wherein the right angle is formed between said second plane, which is the perpendicular center plane through transducer arm 60, and radius 70 of record disk 16. The hypotenuse of said right angle triangle is said third plane. If platform 12 now rotates record disk 16 in a clockwise direction, a pulling force will be exerted upon transducer arm 60, the former being exerted parallel to said first plane and parallel to and in line with said second plane. Said pulling force is the first force, indicated by a straight arrow 72 in FIGS. 2 and 3. Because of the practically frictionless support of transducer arm support carriage 34 by guide means 32, a product force results. Said product force acts in said third plane, parallel to said first plane and in the first direction toward first axis 14, and is the mathematical product of said first force and the Cosine of the angle, formed between said second plane and said third plane. To prevent linear movement of transducer arm support carriage 34 in said first direction, which would alter said right angle between said second plane and radius 70, a second force is applied to transducer arm support carriage 34 in a second direction, said second force being equal and opposite to said product force in order to exactly counterbalance the tendency of transducer arm support carriage 34 to move in said first direction. As transducer arm 60 now undergoes angular rotation, guided by the spiral groove of record disk 16, transducer arm 60 reduces said angle between said second plane and said third plane, thus increasing the numerical value of said Cosine of said angle and thus also increasing said product force. If said second force were a constant force, transducer arm support carriage 34 would now slide uncontrolled in said first direction. It is therefore necessary that said second force is continuously increased as a direct function of said Cosine of said angle as the latter is being continuously reduced by the angular movement of transducer arm 60 toward the "end of play" position shown in FIG. 3. Therefore, a mass 74 which is shown immersed in liquid 76 in container 78 is connected to stud 38 by string 80 via pulley 82, the latter being able to freely pivot about pin 84 which, in turn, is fastened to extension 86 of guide means support 34. Container 78 is threaded into base plate 10 via threaded stud 88, which is unitary with container 78. This arrangement allows for vertical adjustment of container 78. Nut 90 and washer 92 serve to lock container 78 in its correct perpendicular position, once the latter has been determined. The reason for the ability of container 78 to be adjustable perpendicular to said first plane, will be explained after the purpose of mass 74 and liquid 76 has been made clear.

In order for mass 74, liquid 76 and container 78 to provide said increasing second force, mass 74 must have a greater specific gravity than liquid 76. Also, mass 74 must have a contour which is governed by said Cosine, while cavity 94 of container 78 must have internal walls which are parallel to each other. Therefore, the cross sectional area of mass 74 (measured parallel to said first plane) becomes progressively larger in a direction away from the point of suspension of mass 74 by string 80.

The mathematical methods by which said combination of mass 74, liquid 76 and container 78 were determined are shown below:

Real weight of mass 74:
Y ·COS α min.
Weight of total liquid 76 displaced:
Y ·(COS α min. −COS α max.)
Volume of total liquid 76 displaced:
Same as volume of mass 74
Cross sectional area of mass 74 at infinite Intervals, progressing from the point of suspension of mass 74 to its opposite end:

$$\frac{\cos\alpha - \cos\beta}{X} \div \frac{Z}{\cos\beta} - \frac{Z}{\cos\alpha}$$

where:
α is the next smaller angle between said second plane and said third plane, decreasing in infinitely smaller steps.
β is the angle between said second plane and said third plane which is an infinite step larger than α.
X is the weight of total liquid 76 displaced.
Y is said pulling force.
Z is the length of transducer arm 60 from second axis means 42 and 44 to stylus 66.

When transducer arm support carriage 34 is in the "beginning of play" position shown in FIG. 2, mass 74 is almost totally immersed in liquid 76. The fact that the specific gravity of mass 74 is higher than the specific gravity of liquid 76, causes stud 38 mounted on transducer arm support carriage 34 to "see" an effective force which is less than it would be, if mass 74 were not immersed in liquid 76. This effective force exactly equals said product force, thus causing the moving system to be in equilibrium. As transducer arm 60 rotates toward first axis 14, said numerical value of said Cosine increases, in turn causing said product force to increase. As said product force increases, mass 74 is lifted from liquid 76, thus increasing said effective force to always exactly counterbalance said product force. The reason for said progressively larger cross sectional area of mass 74 is the fact that said numerical value of said Cosine increases in a non-linear fashion.

In order to eliminate interaction between mass 74 and liquid 76 caused by surface tension of liquid 76, mass 74 is not completely submerged when it is in its lowermost position and it remains partly immersed, when it is in its uppermost position.

After reading the above description, those skilled in the art will understand, that for every position of transducer arm support carriage 34 along guide means 32, there is one particular perpendicular position for mass 74 in relation to the level of liquid 76, wherein said position of transducer arm support carriage 34 is determined by the angular position of transducer arm 60. The aforementioned ability of container 78 to be adjustable perpendicular to said first plane, serves to eliminate accumulated tolerances which are unavoidable in any manufactured device. It allows the exact "timing" of the level of liquid 76 along the longitudinal, perpendicular extent of mass 74.

Since it would not be easy, to find a material for mass 74 and a liquid 76 which happen to have the correct relationship of specific gravities, it would be easiest, to select a convenient liquid 76 and then develop a mass 74 to suit. This may be done, by making mass 74 hollow so that that cavity may be calibrated by partially filling mass 74 with tungsten powder or the like. In that way one may choose any convenient volume/mass relationship.

Referring now to FIG. 1, 4, 5, 6, 7, 8 and 9, it will be understood, except where noted otherwise, that all linear, angular and rotational movements in reference to FIGS. 1, 4, 5, 6, 7, 8 and 9, will take place parallel to said first plane, which is parallel to record disk 16.

The chief object of the following embodiment of my present invention is basically identical to the chief object of the previous embodiment of my present invention, that is, to maintain an angle of 90° between said second plane which is the vertical center plane of transducer arm 60 and any groove radius between maximum groove radius 18 and minimum groove radius 20 at said point where stylus 66 makes said contact with said spiral groove of record disk 16.

Figure 4:
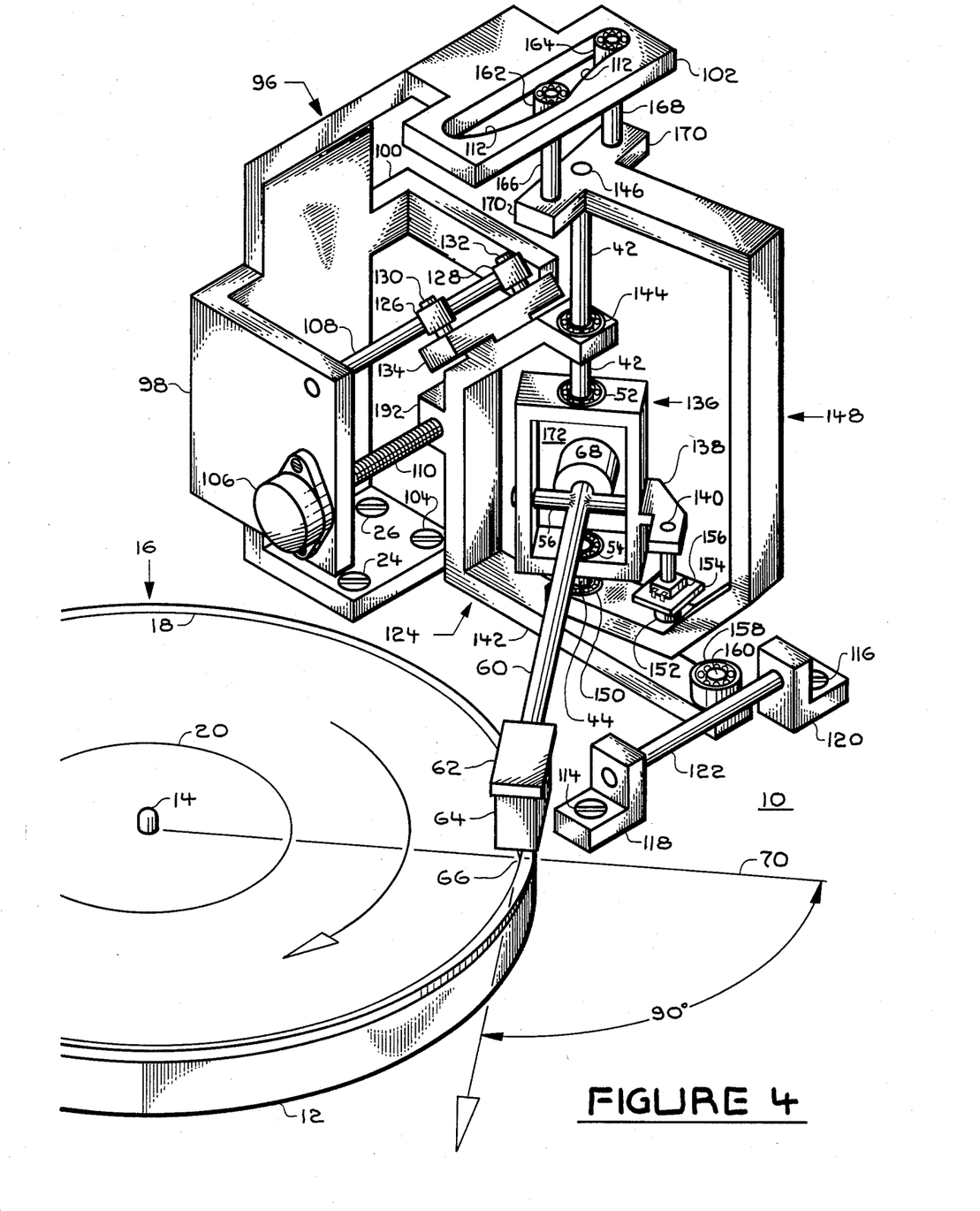
FIG. 4 is an isometric projection of another embodiment of the present invention, showing the transducer arm assembly at the "beginning of play" position.
Figure 5:
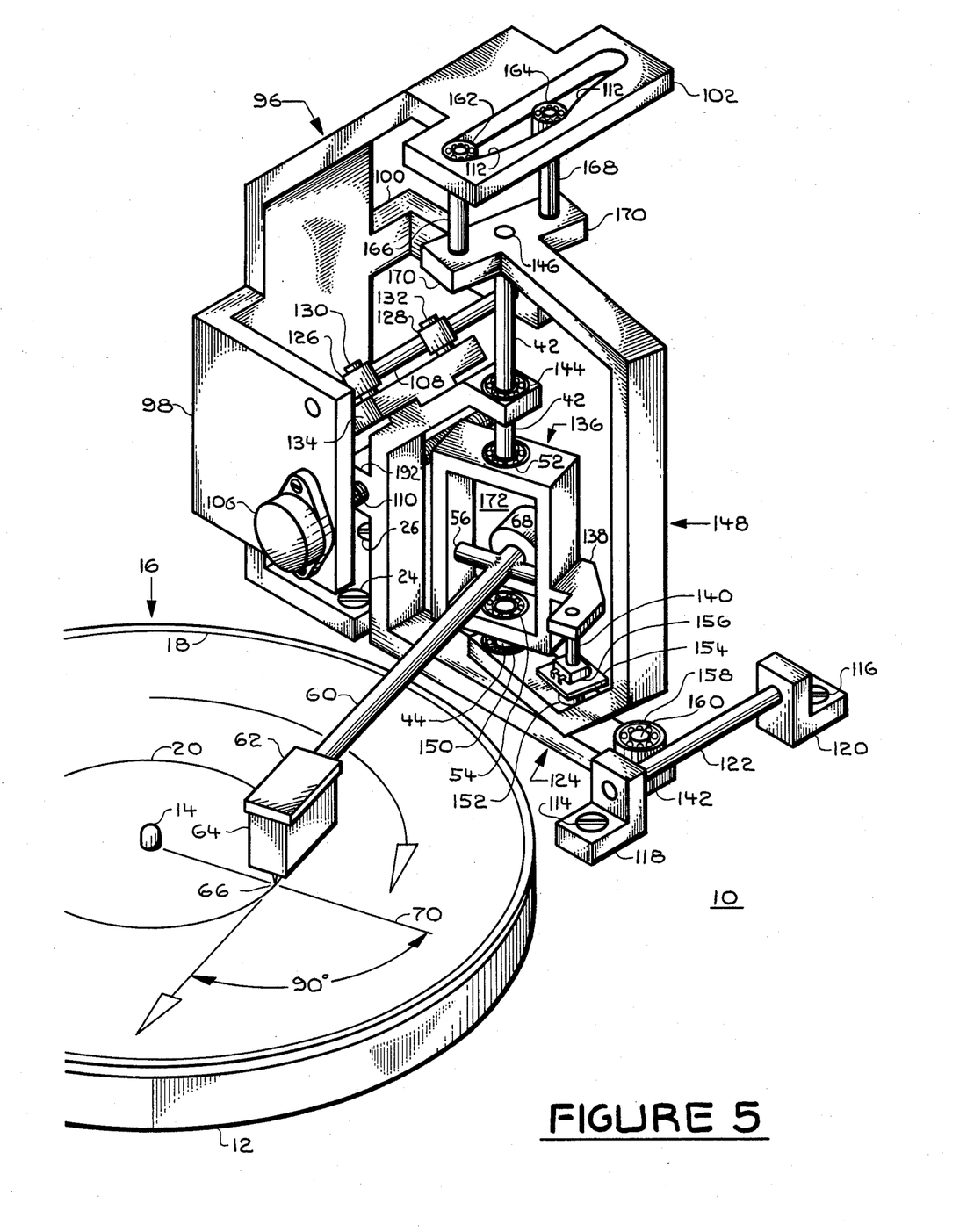
FIG. 5 is identical to FIG. 4, except that the transducer arm assembly is shown at the "end of play" position.

Shown is a disk play-back machine, comprising, a base plate 10 which supports a platform 12 for rotation about a first axis 14. A record disk 16 is supported upon platform 12 for synchronous rotation therewith about first axis 14. A main support 96 is fastened to base plate 10 by screws 24, 26 and 104. Main support 96 has a large bracket 98 and a small bracket 100, both of which are perpendicular to said first plane and said third plane. Large bracket 98 supports a stepping motor 106 and one end of a track rod 108. Small bracket 100 supports the other end of track rod 108. Track rod 108 is supported parallel to said first plane and to said third plane. At the top of main support 96 and rigidly connected thereto, is a cam plate 102 and machined or otherwise formed therein is cam surface means 112 which has undulations in one plane only, namely parallel to said first plane.

Also fastened to base plate 10 by screws 114 and 116 are stabilizer rod brackets 118 and 120 which rigidly support stabilizer rod 122 parallel to said first plane and to said third plane. A special transducer arm support carriage 124 is supported for linear movement upon track rod 108 by ball bearing rollers 126 and 128 whose inner races are press fitted about shafts 130 and 132 respectively which in turn are press fitted into bores (not visible) in shaft support member 134. The latter is unitary with the generally "C" shaped special transducer arm support carriage 124. Shaft support member 134, shafts 130 and 132 and ball bearing rollers 126 and 128 are tilted approximately 45° clockwise when viewed from first axis 14. This would tend to cause special transducer arm support carriage 124 to slide down and to the right. The purpose of this feature will be made clear shortly. A special transducer arm gimbal 136 is assembled to rotate freely within "C" shaped opening of special transducer arm support carriage 124 about second axis means 42 and 44. The low friction pivot media are bearings 52 and 54. Second axis means 44 is press fitted into a bore (not visible) in the lower member 142 of special transducer arm support carriage 124 while second axis means 42 extends down through bearing 144. Second axis means 42 also extends upward and is press fitted into a bore 146 in cross member 170 of true position indicating means 148. The lower part of true position indicating means 148 pivots about second axis means 44 via bearing 150. Both, special transducer arm gimbal 136 and true position indicating means 148 are freely pivotable relative to each other and relative to special transducer arm support carriage 124. The inner race of stabilizer bearing 158 is press fitted about pin 160 which in turn is press fitted into a bore (not visible) at the extreme free end of lower member 142. The inner races of first and second cam follower means 162 and 164 respectively and press fitted about shafts 166 and 168 respectively which in turn are press fitted into bores in cross member 170 of true position indicating means 148. First and second cam follower means 162 and 164 respectively extend upward through cam plate 102.

A transducer arm tracking force pivot 56 is disposed within rectangular opening 172 of special transducer arm gimbal 136 and parallel to said first plane. A transducer arm 60 is fastened to transducer arm tracking force pivot 56 for arcuate movement in said second plane. A transducer mounting base 62 is unitary with the end of transducer arm 60 which is adjacent to record disk 16. Transducer 64 is mounted to transducer mounting base 62 in such a way, that stylus 66 of transducer 64 is placed into contact with maximum groove radius 18 of record disk 16. A counterweight 68 is fastened to the end of transducer arm 60 which is opposite transducer 64. Counterweight 68 is adjusted to cause the transducer end of transducer arm 60 to be heavier relative to transducer arm tracking force pivot 56, thus forcing stylus 66 into contact with maximum groove radius 18 of record disk 16.

If one assumes that the combined centers of gravity of special transducer arm support carriage 124, special transducer arm gimbal 136, transducer arm 60 and true position indicating means 148 (hereinafter known as the "movable assembly") are located approximately at the point where second axis means 42 and 44 intersects transducer arm tracking force pivot 56, then it becomes clear, that said movable assembly will slip down and to the right as a result of the previously mentioned 45° incline of ball bearing rollers 126 and 128. However, this slipping motion will be checked when the outer race of stabilizer bearing 158 makes contact with stabilizer rod 122 and when the outer races of first and second cam follower means 162 and 164 respectively make contact with cam surface means 112. At this movement, all bearings associated with the linear movement of said movable assembly are in a preloaded condition as a result of the weight of said movably assembly. This preload condition is important to the flawless, shake free linear movement of said movable assembly.

It is also obvious now, that true position indicating means 148 is only free to rotate, when special transducer arm support carriage 124 moves linearly along track rod 108 and stabilizer rod 122. Whenever special transducer arm support carriage 124 stops anywhere along track rod 108, true position indicating means 148 assumes a particular and repeatable angular position which is always free of any looseness or play. Since the upper guidance of special transducer arm support carriage 124 is a result of the fact that first and second cam follower means 162 and 164 respectively, make contact with cam surface means 112, it would appear at first thought, that the undulations of cam surface means 112 would cause said movable assembly to waver up and down as the latter moves along track rod 108. However, the particular curvature of cam surface means 112 was chosen such, that second axis means 42 and 44 travels in a plane, whose flatness is substantially perfect, when said movable assembly moves along track rod 108. Furthermore, the alignment of main support 96 is such, that the plane in which second axis means 42 and 44 travels, coincides with said third plane which intersects first axis 14.

Figures 6, 7:
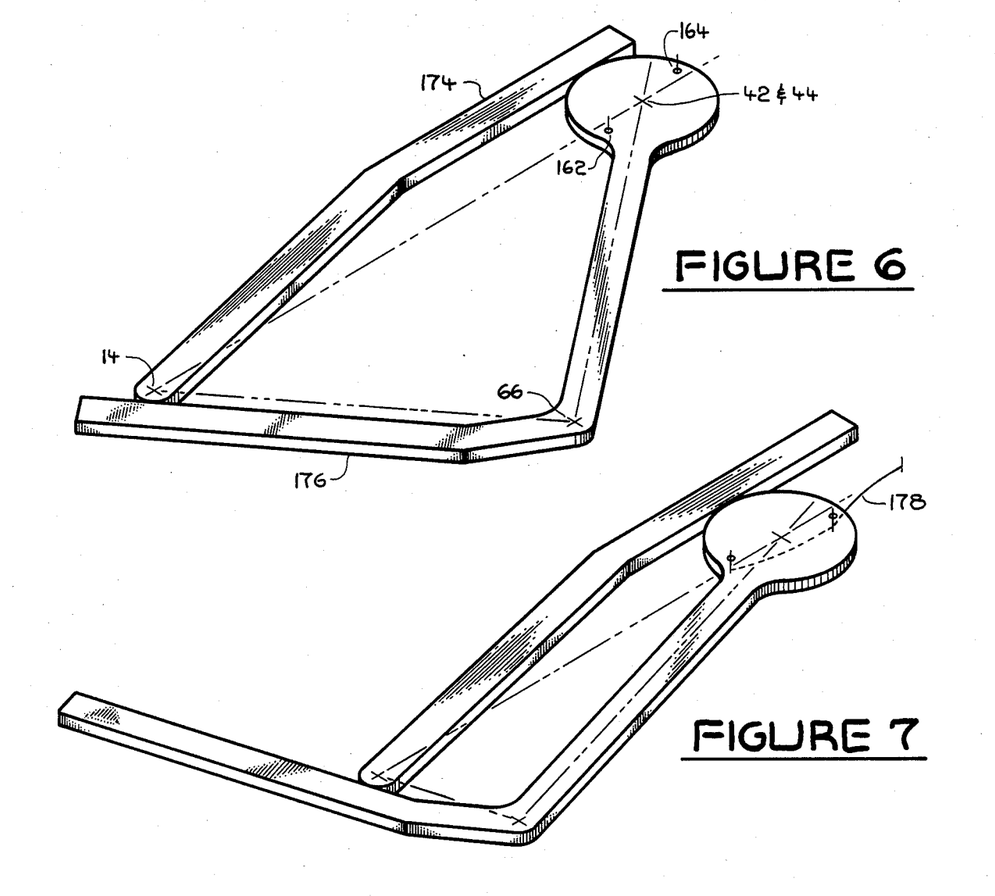
FIG. 6 is an isometric projection of a draftsman's tool, in the "beginning of play" position, used to draw the special cam required in the embodiment of the present invention according to FIGS. 4 and 5.
FIG. 7 is identical to FIG. 6, except that the draftsman's tool is shown in the "end of play" position.
Figure 8:
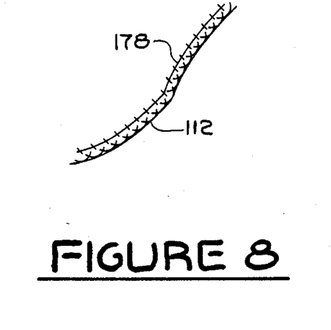
FIG. 8 is a view of the actual cam, developed by a cam follower, travelling along the line generated by the draftsman's tool of FIGS. 6 and 7.
Figure 9:
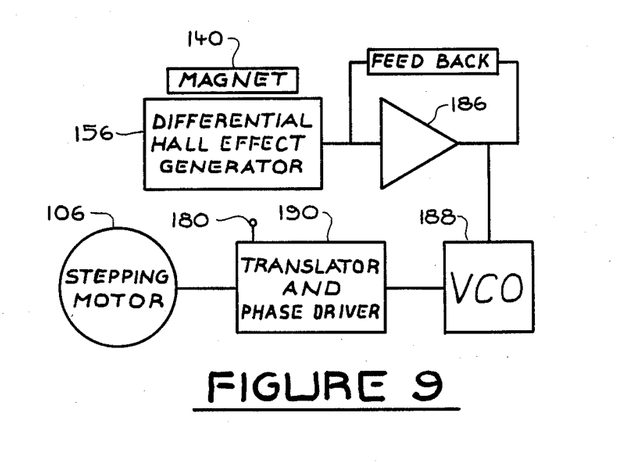
FIG. 9 is a schematic block diagram of the stepping motor circuit used to drive the transducer arm support carriage in the embodiment of the present invention as shown in FIGS. 4 and 5.

Referring now particularly to FIG. 4, it will be assumed, for the moment, that special transducer arm 60 gimbal 136 and true position indicating means 148 are rigidly connected to each other, so that, if either one rotates within special transducer arm support carriage 124, the other must also rotate. If special transducer arm support carriage 124 now slides from the first position show in FIG. 4 to the second position shown in FIG. 5, true position indicating means 148 and special transducer arm gimbal 136 will be forced to rotate clockwise as governed by the physical form of cam surface means 112. This causes transducer arm 60 and thus said second plane to sweep across the surface of record disk 16 toward minimum groove radius 20 as shown in FIG. 5. The physical form of cam surface means 112 is such that said second plane always makes an angle of 90° with record radius 70. In order to prove the above statements, reference is made to FIG. 6 and 7. There is shown a draftsman's tool comprising, a guide 174 and a template 176, actually made by the inventor of the present invention. Template 176 is used to generate the theoretically perfect path 178 described by the center lines of first and second cam follower means 162 and 164 respectively. FIGS. 6 and 7 are analogous to FIGS. 4 and 5 respectively. The positions of first and second cam follower means 162 and 164 respectively are shown as small diameter holes for the insertion of the lead of a draftsman's pencil. While guide 174 is held stationary on top of a sheet of drafting paper, template 176 is moved from the position in FIG. 6 to the position in FIG. 7 in a sliding, rotating fashion, making sure, that template 176 always touches two points on guide 174. Referring now to FIG. 8, one can see the development of cam surface means 112. A compass, inserted at regular intervals into path 178 generated by template 176 and set to draw a radius corresponding to the radii of first and/or second cam follower means 162 and/or 164 respectively is used to generate the actual curvature of cam surface means 112.

Referring once again to FIGS. 4 and 5, it will be shown, how the positions of shafts 166 and 168 and thus the positions of first and second cam followers means 162 and 164 respectively were chosen. The center lines of first and second cam follower means 162 and 164 respectively are disposed on a diametral line which also intersects second axis means 42 and 44. First and second cam follower means 162 and 164 respectively, are opposite each other and equidistant on either side of second axis means 42 and 44. The angle between said diametral line and said third plane in said first position shown in FIG. 4 is equal to one half of the difference between the angle which transducer arm 60 (said second plane) assumes with respect to said third plane in said first position shown in FIG. 4 and the angle which transducer arm 60 assumes with respect to said third plane in said second position shown in FIG. 5. The distance between first cam follower means 162 and second axis means 42 and 44 and thus the distance between second cam follower means 164 and second axis means 42 and 44 is equal to one half of the distance between said first position and said second position of second axis means 42 and 44, divided by the cosine of said angle between said diametral lIne and said third plane in said first position in FIG. 4. This particular arrangement of first and second cam follower means 162 and 164 respectively is the arrangement preferred by the inventor of this present invention as it has for its particular advantage the fact that the position occupied by first cam follower means 162, when second axis means 42 and 44 is in its first position shown in FIG. 4, will be occupied by second cam follower means 164, when second axis means 42 and 44 is in its second position shown in FIG. 5. That fact allows cam surface means 112 to be one continuous surface, which greatly facilitates its manufacture. The above cannot be achieved if said diametral line is placed at any other angle than stated. However, if said diametral line is placed at an angle other than stated, said transducer arm assembly will function equally as well since alternate cam surface means can be developed to match any other angular orientation of said diametral line. However, the disadvantage would be the fact that said alternate cam surface means would take the form of two separate cam surfaces, which is not desirable from a manufacturing standpoint. By now it should be clear to those skilled in the art, that true position indicating means 148 serves as an angular reference base. Therefore, what remains to be made clear is how transducer arm 60 and special transducer arm gimbal 136 are to be kept in the proper angular alignment with true position indicating means 148. A differential Hall effect generator 156 is electrically and mechanically connected to a printed circuit board 154, which in turn is securely and immovably connected to true position indicating means 148 via a standoff 152. A magnet 140, is securely and immovably fastened to magnet holding member 138 of special transducer arm gimbal 136 and is suspended, without touching, slightly above differential Hall effect generator 156. Magnet 140 is actually suspended above differential Hall effect generator 156 in such a way, that the point of maximum magnetic flux of magnet 140 is not above the point of maximum output of differential hall effect generator 156 but slightly behind said point of maximum output. When transducer arm 60 is moved from the position wherein stylus 66 makes contact with maximum groove radius 18 to a position which is closer to minimum groove radius 20, magnet 140 is moved closer toward said point of maximum output of differential Hall effect generator 156. The reason for this is, that magnet holding member 138 of special transducer arm gimbal 136 is moved by the latter in response to the motion of transducer arm 60. As the output signal from differential Hall effect generator 156 increases so does the output signal from a differential amplifier 186. The output of the latter is fed to a voltage controlled oscillator 188 which converts said output signal of differential amplifier 186 to a series of pulses whose frequency is at a predetermined ratio to said output of differential amplifier 186. Said pulses are fed to a translator and phase driver 190 which in turn feeds said pulses sequentially to the various phases of stepping motor 106. Lead screw 110 which is connected to the rotor of stepping motor 106 is now rotated by said rotor of stepping motor 106 and pulls special transducer arm support carriage 124 toward first axis 14 via a thread within threaded boss 192 of special transducer arm support carriage 124. The movement of special transducer arm support carriage 124 toward first axis 14 forces true position indicating means 148 to rotate in a clockwise direction, thus returning differential Hall effect generator 156 to said position slightly ahead of magnet 140, said position being the same as it was before transducer arm 60 moved toward minimum groove radius 20. This action is continuously repeated as long as transducer arm 60 moves toward minimum groove radius 20, keeping said second plane at said angle of 90° to any of said groove radii between maximum groove radius 18 and minimum groove radius 20 at said point where stylus 66 makes said contact with said groove radius.

Upon studying the embodiment of my present invention shown in FIGS. 4 and 5, it is apparent that said movable assembly is "self righting", that is, if said movable assembly is accidentally tilted by a few degrees, the latter will always "fall" back into its said preload condition. The fact, that there are two cam follower means (162 and 164) instead of just one, plays a major part in the successful operation of this mechanism.

Figure 10:
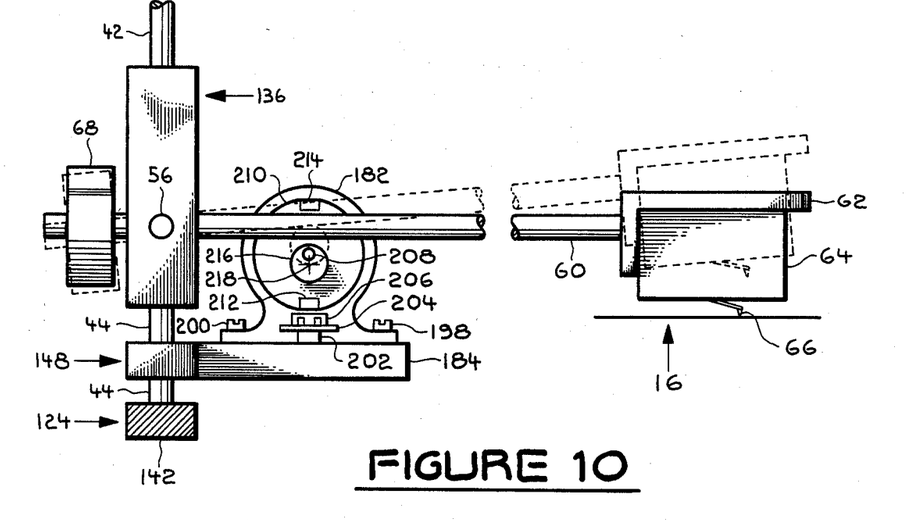
FIG. 10 is a view of the lift motor assembly as used in the embodiment of the present invention as shown in FIGS. 4 and 5.

The following description concerns a device for lifting and for lowering of transducer arm 60. The former is shown in FIG. 10, having been omitted from FIGS. 4 and 5 in order not to obstruct the pertinent mechanisms outlined in the description of FIGS. 4 and 5. Said lifting and lowering device is not absolutely necessary for the proper operation of my present invention but a description is included, since its lifting and lowering function may also be used for other related purposes. Said lifting and lowering device is rigidly attached to true position indicating means 148 and adjacent to that side of transducer arm 60 which is closest to differential Hall effect transducer 156. The fact that said lifting and lowering device is rigidly attached to true position indicating means 148, causes the former to exactly follow the angular movements of true position indicating means 148. And since the latter always occupies the theoretically correct angular position, it follows, that said lifting and lowering device will always be in its correct angular position under transducer arm 60. Said lifting and lowering device comprises, a lift motor 182 which is fastened by screws 198 and 200 to lift motor platform 184 which is unitary with true position indicating means 148. Also fastened to lift motor platform 184 is a stand-off 202 and fastened to the top of the latter is printed circuit board 204. A digital Hall effect switch 206 is mechanically and electrically connected to the former. Digital Hall effect switch 206 is supported such, that its electrical center line is located vertically below lift motor shaft 208. A magnet carrier disk 210 is rigidly fastened to lift motor shaft 208 so that the circumference of the former is in substantially concentric alignment with lift motor shaft 208. Two magnets, 212 and 214 are permanently fixed into and flush with the circumferential surface of magnet carrier disk 210. Magnets 212 and 214 are located opposite to each other on a line which intersects the center line of lift motor shaft 208. The point of maximum magnetic flux of magnet 212 is aligned with said electrical center line of digital Hall effect switch 206 to produce a logic output from the latter. The distance of magnets 212 and 214 from said center line of lift motor shaft 208 is such, that a small air gap exists between magnets 212 and 214 and the top surface of digital Hall effect switch 206. Also rigidly fastened to lift motor shaft 208, is lift pulley 216. The center line of the latter is offset from said center line of lift motor shaft 208 in the direction of magnet 212. The condition described above and shown in FIG. 10, is the "transducer arm (60) playing" condition. In this condition a small gap exists between lift pulley 216 and transducer arm 60, to allow the latter to freely traverse record disk 16. Also, said logic output of digital Hall effect switch 206 is connected to the enable/disable input 180 of transistor and phase driver 190 to enable the latter to transmit said pulses to stepping motor 106. When it is desired to lift transducer arm 60 from record disk 16, a manual switch, which closes the lift motor "run" circuit, is actuated by an operator, whereupon lift motor 182 causes magnet carrier disk 210 and thus lift pulley 216 to rotate. When magnet 214 approaches and subsequently lines up with said electrical center line of digital Hall effect switch 206, the logic output of the latter opens said lift motor run circuit and disables translator and phase driver 190 via enable/disable input 180. Thus, the armature of lift motor 182 rotates 180° each time the latter is actuated and each time said transducer arm assembly is in one of two conditions: (1) Transducer arm 60 up, translator and phase driver 190 disabled and stepping motor 106 not running, and: (2) Transducer arm 60 playing, translator and phase driver 190 enabled and stepping motor 106 running. Thus, stepping motor 106 only rotates, when the positions of magnet carrier disk 210 and lift pulley 216 require it. Said logic output of digital Hall effect switch 206 may also be used to start and stop an "elapsed stylus time counter" i.e. an electronic counter or clock would store the actual time stylus 66 spends in the groove of a record. Said logic output of digital Hall effect switch 206 would assure that said electronic counter or clock would only accumulate elapsed time, when transducer arm 60 is in said playing condition.

The circuits associated with said actuating switch of lift motor 182, the digital Hall effect switch 206 and said elapsed stylus time counter have not been illustrated, as they are old and well known in the art.

Figure 11:
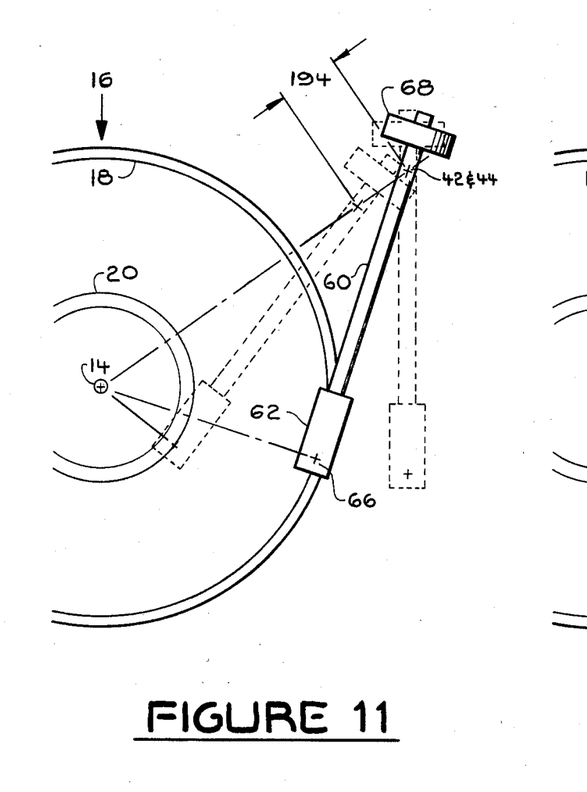
FIG. 11 is a general view of the present invention showing the extreme positions of the transducer arm.
Figure 12:
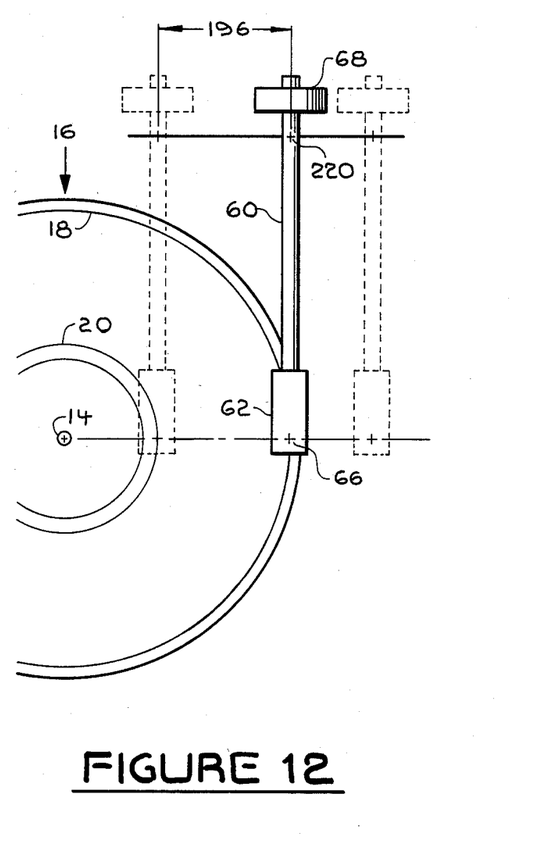
FIG. 12 is a view of a conventional tangentially tracking transducer arm assembly.
Figure 13:
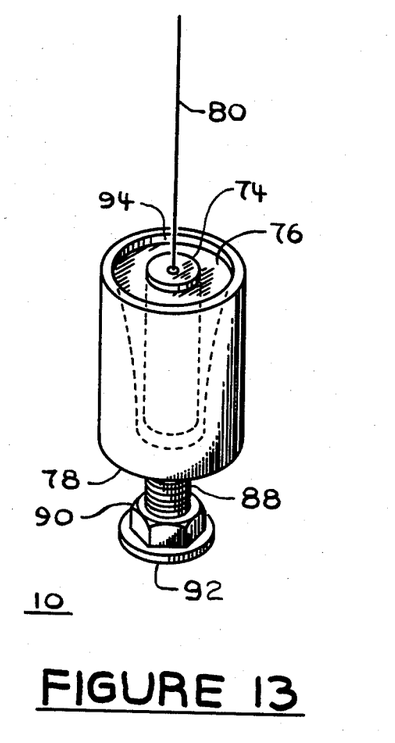
FIG. 13 is a view of a variation of the mass, liquid and container combination shown in FIGS. 2 and 3.

Finally, FIGS. 11 and 12 are presented to compare either of the two embodiments of my present invention in FIG. 11 to a conventional transducer arm assembly of the tangential kind in FIG. 12. Referring now to FIGS. 11 and 12 simultaneously, it should be clear, that in order for stylus 66 to move from maximum record radius 18 to minimum record radius 20, second axis means 42 and 44 will move along novel short track 194 in FIG. 11 and second axis means equivalent 220 in FIG. 12 will move along conventional long track 196. FIGS. 11 and 12 illustrate the fact that second axis means 42 and 44 travels a much shorter distance and is therefore not subject to the mechanical disturbances common in prior art tangentially tracking transducer arm assemblies. The space requirement for mounting novel short track 194 has also been vastly reduced when compared to the space requirement of conventional long track 196. Finally, it is commonly held, that for a transducer arm assembly to qualify as a true tangentially tracking kind, stylus 66 has to move along a straight line, as it moves from maximum record radius 18 to minimum record radius 20. My present invention proves that that is not so, as stylus 66 describes a curved path as it moves from maximum record radius 18 to minimum record radius 20.

It is apparent from the foregoing that there is provided an improved transducer arm assembly for disk play back machines which effectively avoids the disadvantages of prior art transducer arm assemblies and which achieves the foregoing objects of the invention. It is to be understood that the device described and shown in this specification is merely illustrative of the best modes presently contemplated for carrying out the principles of the present invention, and is susceptible to change in form, size, detail and arrangement of parts, the invention being intended to cover all such variations, modifications and equivalents thereof as may be deemed to be within the scope of the claims appended hereto.

What I claim and desire to secure by Letters Patent is:

1. A disk play-back machine comprising
   a base plate supporting, a platform rotatable about a first axis in a plane parallel to said base plate, a record disk resting upon said platform for concentric rotation about said first axis in a plane parallel to said base plate, and a first plane, containing the uppermost spirally grooved surface of said record disk, a transducer arm defining a second plane which is perpendicular to said base and having a transducer, supporting a stylus at a first end and having second axis means at a second end wherein said transducer arm is adapted for pivoting and sliding movement from a first acute angle position to a second acute angle position parallel to said platform wherein said pivoting movement takes place about said second axis means and wherein said second axis means is adapted to slide in a third plane which is parallel to and intersects said first axis and wherein said first and second acute angles are formed by said transducer arm and said third plane,
   a transducer arm support carriage and low friction guide means therefor adapted to enable said second axis means to slide from a first position to a second position in said third plane and in a first direction toward said first axis in direct response to a product force which is defined as the product of the cosine of any acute angle formed by said transducer arm and said third plane and the frictional pulling force generated between said rotating record disk and said stylus at the instant in time when said second plane is tangent to any groove radius at the point where said stylus contacts said rotating record disk,
   and wherein the improvement comprises second force applying means acting parallel to said first plane in said third plane and in a second direction in direct opposition to said product force and wherein said second force is always substantially equal to said product force, as the latter varies in response to the movement of said transducer arm in a plane which is parallel to said first plane.

2. A disk play-back machine according to claim 1 wherein said second force takes the form of a mass flexibly connected to said transducer arm support carriage and being partially suspended in a liquid within a container and wherein said mass is adapted to be partially lifted from said liquid against gravity in response to movement in said first direction of said transducer arm support carriage and wherein the specific gravity of said liquid is less than the specific gravity of said mass.

3. A disk play-back machine according to claim 2 wherein the cross-sectional area of said mass increases in the direction of gravity and wherein the cross-sectional area of said container remains constant in the direction of gravity.

4. A disk play-back machine according to claim 2 wherein the cross-sectional area of said mass remains constant in the direction of gravity and wherein the cross-sectional area of said container decreases in the direction of gravity.

5. A disk play-back machine according to claim 3 or 4 wherein the effective weight of said mass is equal to the gross weight of said mass minus the weight of the displaced quantity of said liquid whose volume is the same as the volume of that part of said mass which is immersed in said liquid and wherein the combination of said cross-sectional areas of said mass and said container provide for a non-linear increase of said effective weight when said mass is lifted from said liquid and from said container and wherein said non-linear increase is identical to the change in said cosine of said acute angle between said first and second acute angles.

6. A disk play-back machine comprising
   a base plate supporting, a platform rotatable about a first axis in a plane parallel to said base plate, a record disk resting upon said platform for concentric rotation about said first axis in a plane parallel to said base plate, and a first plane, containing the uppermost spirally grooved surface of said record disk,
   a transducer arm defining a second plane which is perpendicular to said base and having a transducer, supporting a stylus at a first end and having second axis means at a second end and wherein said transducer arm is adapted for pivoting and sliding movement from a first acute angle position to a second acute angle position parallel to said platform wherein said pivoting movement takes place about said second axis means and wherein said second axis means is adapted to slide in a third plane which is parallel to and intersects said first axis and wherein said first and second acute angles are formed by said transducer arm and said third plane,
   a transducer arm support carriage and low friction guide means therefor, adapted to enable said second axis means to slide from a first position to a second position in said third plane and in a first direction toward said first axis in direct response to electric motor drive means wherein the position of said transducer arm support carriage is continually adjusted in order to keep said transducer arm tangent to any groove radius at the point where said stylus contacts said rotating record disk, and wherein said electric motor drive means is started and stopped in response to an error signal generated by an error detecting pair consisting of a magnet and a differential Hall Effect generator and wherein one or the other of said error detecting pair occupies a fixed position in relation to said transducer arm such as to pivot about said second axis means every time said transducer arm pivots about said second axis means, and wherein the improvement comprises true position indicating means being rotatable about said second axis means along with said transducer arm but independently from the latter and being adapted to mount one or the other of said error detecting pair wherein said true position indicating means is adapted to rotate in a plane parallel to said first plane and toward a unique and particular angular position of substantially infinite resolution with respect to every unique and particular linear position of substantially infinite resolution of said second axis means, while the latter is being transported from said first position to said second position by said transducer arm support carriage and wherein the combination of rotation and sliding of true said position indicating means is substantially identical to the theoretical combination of rotation and sliding of said second plane of said transducer arm, parallel to said first plane while said second axis means slides from said first position to said second position necessary to keep said second plane tangent to any of said groove radii between a maximum and a minimum groove radius at any of the points where said stylus makes said contact with said groove.

7. A disk play-back machine according to claim 6, wherein said true position indicating means comprises first and second cam follower means, whose axes are fixedly attached to said true position indicating means and wherein said axes are disposed at equal distances on either side and parallel to said second axis means and intersecting a diametral line, radiating from said second axis means in a plane parallel to said first plane and wherein said cam follower means are in physical contact with specially shaped cam surface means which is fixedly related to said base plate and which has excursions in a plane parallel to said first plane only.

8. A disk play-back machine according to claim 7 wherein said axis of said first cam follower means is disposed in the area between said second plane and said third plane, said area being defined by said first position of said second axis means and by said first acute angle wherein the angle between said diametral line and said third plane is equal to one half of the difference between said first acute angle and said second acute angle and wherein the distance between said second axis means and said axis of said first cam follower means is equal to one half of the distance between said first position and said second position of said second axis means divided by the cosine of said angle between said diametral line and said third plane.

9. A disk play-back machine according to claim 8 wherein said cam surface means comprises two separate surfaces which are steplessly joined at the position of, and tangent to, said first cam follower means when said second axis means is at said first position wherein one of said separate surfaces is convex and joins said first and second cam follower means when said second axis means is in said first position and wherein the other of said separate surfaces is concave and joins said first and second cam follower means when said second axis means is in said second position and when said second cam follower means is at the position previously occupied by said first cam follower means while said second axis means occupied said first position and wherein the rate of change of the curvature of one of said separate surfaces is substantially identical to the rate of change of the curvature of the other of said separate surfaces.

10. A disk play-back machine according to claim 9 wherein said true position indicating means provides a reference platform for a differential Hall Effect generator which, in cooperation with a magnet mounted to said transducer arm generates an error signal when said second plane of said transducer arm leaves the position of tangency with said groove at the point where said tylus contacts said groove in response to the inward spiral of said groove and wherein said error signal is used to actuate said electric motor drive means which drives said transducer arm support carriage and thus said second axis means in said first direction until said second plane is again tangent to said groove at the point where said stylus contacts said groove and wherein the movement of said second axis means in said first direction causes said true position indicating means to be rotated by said cam surface mans which has the effect of nulling said error signal and which stops said electric motor drive means until another error signal is generated.

11. A disk play-back machine according to claim 6 wherein said true position indicating means comprises lowering and lifting means attached thereto and adapted for movement therewith in a plane parallel to said first plane and adapted for lowering and lifting said transducer arm and wherein sensor means sense said lowered and lifted condition of said transducer arm.

12. A disk play-back machine according to claim 11 wherein said sensor means enables said electric motor drive means when said transducer arm is in said lowered condition and wherein said sensor means disables said electric motor drive means when said transducer arm is in said lifted condition.

13. A dis play-back machine according to claim 11 wherein said sensor means activates an elapsed time counter when said transducer arm is in said lowered condition and wherein said sensor means deactivates said elapsed time counter when said transducer arm is in said lifted condition.

14. A disk play-back machine according to claim 11 wherein said sensor means comprises at least one Hall Effect generator and at least one magnet.

15. A disk play-back machine according to claim 6 wherein said electric motor drive means comprises a stepping motor.

* * * * *